United States Patent [19]
Stucky et al.

[11] Patent Number: 5,169,566
[45] Date of Patent: * Dec. 8, 1992

[54] ENGINEERED CEMENTITIOUS CONTAMINANT BARRIERS AND THEIR METHOD OF MANUFACTURE

[75] Inventors: Galen Stucky, Santa Barbara, Calif.; Hamlin M. Jennings, Evanston, Ill.; Simon K. Hodson, Santa Barbara, Calif.

[73] Assignee: E. Khashoggi Industries, Santa Barbara, Calif.

[ * ] Notice: The portion of the term of this patent subsequent to Mar. 31, 2009 has been disclaimed.

[21] Appl. No.: 619,317

[22] Filed: Nov. 28, 1990

Related U.S. Application Data

[63] Continuation-in-part of Ser. No. 526,231, May 18, 1990, abandoned.

[51] Int. Cl.$^5$ ............................ G21F 9/16; G21F 9/12
[52] U.S. Cl. ..................................... 252/629; 252/626; 252/628; 252/633
[58] Field of Search ............... 252/625, 627, 628, 629, 252/633, 626; 376/272; 52/310

[56] References Cited

U.S. PATENT DOCUMENTS

| | | | |
|---|---|---|---|
| 1,427,103 | 8/1922 | Haenicke | 264/DIG. 43 |
| 3,468,993 | 9/1969 | Bierlich | 264/82 |
| 3,526,172 | 9/1970 | Stuart | 94/25 |
| 3,749,917 | 7/1973 | Kucherer | 250/108 R |
| 3,778,948 | 12/1973 | Berthier | 52/302 |
| 3,917,781 | 11/1975 | Gabriel et al. | 264/71 |
| 3,935,467 | 1/1976 | Gablin | 250/507 |
| 3,950,470 | 4/1976 | Davidovits | 264/113 |
| 3,959,172 | 5/1976 | Brownell et al. | 252/301.1 W |
| 3,983,050 | 9/1976 | Mecham | 252/301.1 |
| 3,985,925 | 10/1976 | Lefebvre et al. | 428/92 |
| 3,993,579 | 11/1976 | Bunnell et al. | 252/301.1 W |
| 4,000,027 | 12/1976 | Dalle et al. | 156/73.6 |
| 4,017,417 | 4/1977 | Clark et al. | 252/301.1 |
| 4,028,454 | 6/1977 | Davidovits et al. | 264/82 |
| 4,222,889 | 9/1980 | Uerpmann | 252/301.1 |
| 4,249,949 | 2/1981 | Wooler et al. | 106/90 |
| 4,257,912 | 3/1981 | Fleischer et al. | 252/301.1 |
| 4,299,722 | 11/1981 | Stock et al. | 252/628 |
| 4,349,386 | 9/1982 | Davidovits | 106/85 |
| 4,407,769 | 10/1983 | Harada et al. | 264/60 |
| 4,428,700 | 1/1984 | Lennemann | 405/128 |
| 4,452,635 | 6/1984 | Noshi et al. | 106/74 |

(List continued on next page.)

FOREIGN PATENT DOCUMENTS

| | | | |
|---|---|---|---|
| 83727161 | 9/1982 | U.S.S.R. | |
| 1311662 | 3/1973 | United Kingdom | 264/333 |

*Primary Examiner*—Brooks H. Hunt
*Assistant Examiner*—Daniel Jenkins
*Attorney, Agent, or Firm*—Workman, Nydegger & Jensen

[57] ABSTRACT

Novel cementitious contaminant barriers are formed by positioning a hydraulic cement composition into a predetermined configuration and then hydrating the cement composition. The contaminant barriers of the present invention include at least one liquid, gas, or ion getter capable of binding with or absorbing liquids, ions, or gases which may penetrate the barrier. The contaminant barriers of the present invention may be engineered to include mixtures of different getters, single and multiple layers of different getters, multiple layers of cement and getters, and a host of different getter, cement, mixture, and layer combinations.

Novel waste containers are advantageously prepared utilizing contaminant barriers within the scope of the present invention. The waste containers may be prepared by surrounding waste material with at least one getter and with a powdered hydraulic cement composition and then compressing the cement and getter around the waste material. Preformed waste containers may also be prepared within the scope of the present invention. Use of reinforcing fibers and aggregates to improve the mechanical properties of the hazardous waste container is disclosed.

29 Claims, 3 Drawing Sheets

U.S. PATENT DOCUMENTS

| | | | |
|---|---|---|---|
| 4,472,199 | 9/1984 | Davidovits | 106/85 |
| 4,509,985 | 4/1985 | Davidovits et al. | 106/84 |
| 4,518,508 | 5/1985 | Conner | 210/751 |
| 4,522,652 | 6/1985 | Neuschäeffer et al. | 106/84 |
| 4,533,393 | 8/1985 | Neuschaeffer et al. | 106/18.12 |
| 4,581,162 | 4/1986 | Kawamura et al. | 252/628 |
| 4,608,795 | 9/1986 | Neuschaeffer et âl. | 52/309.12 |
| 4,640,715 | 2/1987 | Heitzmann et al. | 105/85 |
| 4,642,137 | 2/1987 | Heitzmann et al. | 106/85 |
| 4,642,204 | 2/1987 | Burström et al. | 252/633 |
| 4,652,404 | 3/1987 | Mallek et al. | 252/628 |
| 4,671,897 | 1/1987 | Mori et al. | 252/628 |
| 4,681,631 | 7/1987 | Engels et al. | 106/4 |
| 4,708,822 | 11/1987 | Fukasawa et al. | 252/628 |
| 4,834,917 | 5/1989 | Ramm | 252/633 |
| 4,859,367 | 8/1989 | Davidovits | 252/628 |
| 4,863,638 | 9/1989 | Harper, III | 252/633 |
| 4,888,311 | 12/1989 | Davidovits et al. | 501/95 |
| 4,904,416 | 2/1990 | Sudo et al. | 252/628 |
| 4,952,321 | 8/1990 | Bradshaw et al. | 210/670 |

ENGINEERED CEMENTITIOUS CONTAMINANT BARRIERS AND THEIR METHOD OF MANUFACTURE

BACKGROUND

1. Related Applications

This patent application is a continuation-in-part of copending patent application Ser. No. 07/526,231, filed May 18, 1990, now abandoned in the names of Hamlin M. Jennings and Simon K. Hodson and entitled "HYDRAULICALLY BONDED CEMENT COMPOSITIONS AND THEIR METHODS OF MANUFACTURE AND USE," which is incorporated herein by specific reference. Another related patent application Ser. No. 07/556,086, filed Jul. 20, 1990, now U.S. Pat. No. 5,100,586 in the names of Hamlin M. Jennings and Simon K. Hodson and entitled "CEMENTITIOUS HAZARDOUS WASTE CONTAINERS AND THEIR METHOD OF MANUFACTURE," is also incorporated herein by specific reference.

2. The Field of the Invention

The present invention relates to engineered cementitious contaminant barriers. More particularly, the present invention is directed to contaminant barriers prepared from cementitious materials capable of isolating contaminants, including toxic and radioactive waste materials, from a substantially uncontaminated environment. The cementitious barriers include compounds capable of adsorbing, absorbing, chemically reacting with, bonding with, or otherwise trapping contaminants in the form of liquids, dissolved ions, and gases which might otherwise penetrate or leach through the barrier.

3. Technology Review

In recent years, the public has become more sensitive to the environment and the effect of hazardous and toxic waste materials on the environmental ecosystem. In particular, the public has recognized the need and desirability of being free from exposure to toxic wastes and other hazardous chemicals and chemical by-products.

One of the most serious exposures to toxic waste materials occurs when the ground water of a community becomes contaminated. Ground water contamination not only effects the health and safety of humans, but also other forms of plant and animal life Ground water contamination can result from direct introduction of harmful chemicals into the water source. In such cases, the problem is usually remedied by identifying the source of contamination and prohibiting future disposal of the waste without adequate waste treatment.

A more difficult problem occurs when the water supply becomes contaminated through harmful chemicals which enter and migrate through the soil into the water supply. Often this happens when barriers built to contain the hazardous waste, such as hazardous waste containers and in situ barriers, allow waste chemicals to leach through the barrier into the uncontaminated environment. There is, therefore, a serious need for effective barriers used in the storage and containment of hazardous and toxic waste materials until they decompose into harmless compounds.

Of the various toxic and hazardous waste materials which need to be contained, nuclear waste materials are some of the most dangerous because their damage is permanent and they can remain radioactive for extremely long periods of time. Much of the radioactive waste materials which needs to be disposed of includes refuse from nuclear weapons plants, civilian nuclear power plants, and medical industry sources.

Unlike spent fuel rods which decay by emitting high level gamma radiation, the plutonium waste from weapons plants decays by emitting alpha particles. Alpha particles do not even penetrate paper. As a results the plutonium waste materials from weapons plants may be handled without protective clothing and pose no danger, as long as they remain sealed Nevertheless, plutonium is extremely toxic and very long-lived.

In addition, it is estimated that sixty percent (60%) of the plutonium-contaminated waste from weapons plants is "mixed" waste. Mixed waste is particularly difficult to handle be cause it contains both radioactive waste and hazardous chemicals such as industrial solvents. Containing and disposing of mixed waste is difficult because disposal techniques used for radioactive waste are not suitable for the organic hazardous waste and disposal techniques for hazardous waste are ineffective for the radioactive waste.

Gloves, shoes, uniforms, tools, floor sweepings, and sludge contaminated with transuranicradioactive materials while manufacturing nuclear warheads are typically contained in 55 gallon steel drums. The Waste Isolation Pilot Project ("WIPP") site near Carlsbad, N.M. is one possible radioactive waste disposal site. The WIPP site was excavated in a massive underground salt formation. Underground salt formations, such as the WIPP site, are considered as possible permanent radioactive waste disposal sites because of the long-term stability of the underground formation and because the salt strata has a low water permeability.

In one possible disposal plan using underground disposal sites for low-level radioactive waste materials, the underground rooms are filled with the waste containers and back-filled with a grout material to fill as much empty space as possible. During the first 100 years, the underground storage rooms would collapse and crush the waste containers.

One problem with conventional 55 gallon steel drums is that they often contain a lot of empty space inside the drums. Eventually, the drums will be crushed when the storage room collapses; however, the presence of empty spaces permits ground water to seep into the cavities which can cause corrosion of the steel drum, gas generation, and decomposition of organic waste materials. Since the disposal site is not completely sealed until the underground storage room collapses and fills all void spaces, rapid collapse of the storage room is desirable so that the disposal site is sealed and stabilized as quickly as possible.

Another disadvantage of conventional 55 gallon steel drums is that they are potentially capable of undergoing corrosion which would produce gases, especially hydrogen gas ($H_2$), and which may lead to high pressure bubbles. Corrosion and its related gas evolution are considered long term liabilities. Corrosion is caused by groundwater, usually containing high concentrations of dissolved ions (i.e., 1 to 2 molar). If the hazardous waste includes organic materials, such as contaminated rubber and certain waste solvents, carbon dioxide gas ($CO_2$) may be produced which may also lead to high pressure bubbles.

Only recently has the need to avoid formation of the so-called high pressure bubbles been recognized. Current government regulations of long-term hazardous waste storage sites assume that at some time over the storage lifetime, the storage medium will be breached by underground drilling devices. If high pressure bubbles exist at the location where the storage medium is breached, then it is possible that contaminated materials may be inadvertently released under pressure.

Processing and reprocessing of radioactive materials, including spent fuel, produces large quantities of liquid waste materials. It is a common practice, when dealing with low level liquid waste, to concentrate the radioactive waste's values in the liquid before disposal. The following concentrating methods have been suggested: evaporation of the liquids, fixation of radioisotopic elements by solids, precipitation of radioisotopic elements by solids, precipitation of radioisotopic elements from the waste liquids, and calcination of the waste liquids.

One of the most practical approaches to the disposal of waste liquids is fixation of the radioactive elements on a solid, as by adsorption or ion-exchange, in which radioactive ions in the waste are exchanged with non-radioactive ions in a solid ion-exchanger. The liquid, free from radioactive ions, may then be safely released for further purification processing. The spent ion-exchanger is then typically vitrified to form a leach-resistant and corrosion-resistant glass which can be stored in geologically stable sites.

Although vitrification of spent ion-exchangers is a common industry practice, there remain several troublesome problems. One such problem is the volatilization of radioactive cesium and strontium during the melting operation. Moreover, the extremely high temperatures required for melting the glass matrix renders disposal of the large volumes of waste uneconomical. Therefore, there is a significant need in the art for low temperature fixation techniques of hazardous waste materials.

One low temperature technique for solidifying non heat-generating radioactive wastes in the form of liquids, sludges, or solids is by mixing the waste with cement and casting the mixture into drums. This low-cost cementation process is attractive for encapsulating relatively large volumes of intermediate level waste. However, it is possible for radionuclides to be released from the final waste form by leaching if there is contact with water. Thus, there is a need in the art for storage systems which do permit hazardous compounds to leaching into the uncontaminated environment.

An ideal waste containment system should satisfy some of the following characteristics:
(1) the contaminant barrier should be made of a non-metal or other material which intrinsically does not corrode and produce gases;
(2) the contaminant barrier should be inexpensive;
(3) the contaminant barrier should prevent contaminant liquids, dissolved ions, or gases from escaping or permeating the barrier;
(4) the contaminant barrier should be of a material which "self-heals" upon contact with an aqueous solution; and
(5) for long term storage, the contaminant barrier should be made of a material having a record of long term geologic stability.

The term "self-healing" means that if a crack forms in the contaminant barrier, the presence of water will cause a hydration reaction forming an integral bond between the cracked surfaces.

From the foregoing, it will be appreciated that what is needed in the art are contaminant barriers which are constructed of materials which do not intrinsically corrode to produce gases.

Additionally, it would be a significant advancement in the art to provide contaminant barriers which include liquid, ion, and gas getters.

It would be a further advancement in the art to provide contaminant barriers constructed of materials which are self-healing upon contact with aqueous solution.

It would be another advancement in the art to provide contaminant barriers which do not require high temperature or vitrification processes.

Finally, it would be an important advancement in the art to provide contaminant barriers which are inexpensive.

Such contaminant barriers are disclosed and claimed herein.

BRIEF SUMMARY AND OBJECTS OF THE INVENTION

The present invention is directed to engineered cementitious contaminant barriers. The cementitious contaminant barriers are formed by positioning a hydraulic cement composition and one or more liquid, ion, or gas getters into a predetermined configuration and then hydrating the cement composition without substantial mechanical mixing of the cement and water.

The contaminant barriers of the present invention are capable of isolating contaminants, including toxic and radioactive waste materials, from a substantially uncontaminated environment. As such, the barriers may be prepared in a variety of configurations including, but not limited to, waste storage and disposal containers, in situ barrier walls, pipes, tanks, wells, or envelopes.

The use of getters in combination with powdered hydraulic cement processing techniques, described in greater detail below, enable contaminant barriers to be engineered for effective isolation of a wide variety of different contaminants, including materials such as highly toxic and radioactive waste materials. As used herein, the term "getter" includes materials which adsorb, absorb, chemically react, ionically bond, trap, attract, or otherwise bind to selected liquids, gases, or ions. Zeolites and layered clays are examples of typical getters which might be used in the present invention.

The contaminant barrier is preferably engineered or designed such that a sufficient quantity and type of getters are added to account for the anticipated liquid, gas, or ion contaminant generation by the waste material over the life of the waste. In some cases, the getters may be mixed with the hydraulic cement composition prior to forming the contaminant barrier. In other cases, the contaminant barrier may contain one or more carefully positioned getter layers combined with one or more layers of cement.

The contaminant barriers within the scope of the present invention are intended to provide a boundary or barrier which separates the contaminated environment from the uncontaminated environment. On a large scale, the present invention includes in situ barriers for isolating hazardous waste materials from the environment. On a smaller scale, the present invention also includes waste containers in which the contaminant barriers form the container walls. Such containers may be divided into two general categories: (1) empty containers into which contaminants are added after the container is formed; and (2) containers which are prepared by surrounding contaminants with one or more getters and powdered hydraulic cement, compressing the cement and getter around the contaminants, and allowing at least a portion of the hydraulic cement to hydrate.

The cementitious barriers preferably undergo some hydration to close the cement pore structure and to provide mechanical strength. The amount of hydration may vary from a very nominal amount to extensive hydration depending upon the desired properties and characteristics of the final contaminant barrier. In some cases, the cementitious barrier may even be hydrated from exposure to ambient water in the environment such as water vapor in the air or from ground water in an underground storage facility.

It is also within the scope of the present invention to provide the water necessary for hydration from gypsum (a hydrated calcium sulphate, $CaSO_4.2H_2O$), ettringite (a calcium sulphoaluminate, $3CaO.Al_2O.3CaSO_4.31H_2O$), zeolites containing water (such as zeolite X and zeolite Y), or other compounds containing water in a crystalline form. The compounds are combined with the powdered hydraulic cement prior to forming the cementitious contaminant barrier. Subjecting the zeolites or gypsum in the waste container to mild heating ($<100°$ C.) causes the crystals to release water which is capable of reacting with the cement. High green strengths may also be obtained using this technique.

In addition to water-containing compounds, it is also within the scope of the present invention to use clays, zeolites, or zeolite-like compounds to selectively release beneficial chemicals into the cement matrix upon mild heating or pressure. For instance, cancrinite, a zeolite, and hydrotalcite, a clay, are capable of releasing carbonates into the cement matrix upon mild heating. Carbonates can enhance the strength, chemical stability, and durability of the final cementitious contaminant barrier.

A wide variety of other compounds can be selectively released using clays, zeolites, or zeolite-like compounds. Lowering the pH by adding acid may selectively release basic species. Acids have also been used to release organic anions and carbonates. Likewise, raising the pH with a base releases acid components. In some cases, mild heating, at temperatures less than about 250° C., may selectively release the compounds of interest.

The term "contaminant," as used herein, includes liquids, ions, or gases for which isolation by the cementitious barrier is desired. Contaminants include solid, substantially solid, semisolid, liquid, and gaseous waste as well as liquids, ions, or gases generated by the waste. Contaminants include toxic and radioactive waste, as well as nonhazardous materials for which isolation by the barrier is desired.

Hydraulic cements used within the scope of the present invention are inexpensive, geologically and environmentally stable, and do not produce gases. In some cases, more than one layer of powdered hydraulic cement may be used. For instance, an outer layer of Portland cement may surround an inner layer of expansive and fast reacting high alumina cement. Suitable getters may be mixed with the powdered hydraulic cement. Alternatively, one or more getter layers may be used with one or more cement layers.

Pressure compaction processes, including isostatic compression, are preferably used to position the hydraulic cement and getters into the desired cementitious barrier configuration. Thereafter, the hydraulic cement is preferably hydrated. Various techniques may be used to hydrate the compressed hydraulic cement. For instance, if the barrier is part of a waste container, the container may be hydrated by soaking it in an aqueous solution The aqueous solution would diffuse into the container and hydrate the cement. In some cases, sufficient hydration may be obtained by exposure in a high relative humidity.

It is, therefore, an object of the present invention to provide novel contaminant barriers which are constructed of materials which do not intrinsically corrode to produce gases.

Another important object of the present invention is to provide contaminant barriers which include liquid, ion, or gas getters.

Yet another important object of the present invention is to provide novel contaminant barriers constructed of materials which are self-healing upon contact with aqueous solution.

A further significant object of the present invention is to provide contaminant barriers which do not require high temperature vitrification processes.

An additional object of the present invention is to provide novel contaminant barriers which are inexpensive.

These and other objects and features of the present invention will become more fully apparent from the following description and appended claims, or may be learned by the practice of the invention.

BRIEF DESCRIPTION OF THE DRAWINGS

In order to more fully understand the manner in which the above-recited and other advantages and objects of the invention are obtained, a more particular description of the invention briefly described above will be rendered by reference to a specific embodiment thereof which is illustrated in the appended drawing. Understanding that this drawing depicts only a typical embodiment of the invention and is not, therefore, to be considered limiting in its scope, the invention will be described and explained with additional specificity and detail through the use of the accompanying drawing in which.

DETAILED DESCRIPTION OF THE PREFERRED EMBODIMENTS

The present invention provides novel cementitious contaminant barriers useful for containment of waste materials including highly toxic and radioactive waste materials. The cementitious contaminant barriers within the scope of the present invention are formed by positioning a hydraulic cement composition and one or more getters into a predetermined configuration and then hydrating the cement composition. The getters are capable of binding or absorbing undesirable liquids, ions, or gases which externally penetrate the barrier or which internally leak from contained waste material surrounded by the barrier.

The contaminant barriers within the scope of the present invention provide a barrier which separates a contaminated environment from an uncontaminated environment. The present invention includes in situ barriers for isolating large volumes of waste materials, as well as smaller waste containers. Such containers may be divided into two general categories: (1) preformed containers having lids; and (2) containers which are prepared by compressing hydraulic cement and at least one getter around waste material and allowing at least a portion of the hydraulic cement to hydrate.

Containers within each of the general categories above may include contaminant barriers prepared with (a) a mixture of powdered hydraulic cement and a single getter; (b) two or more getters mixed with a powdered hydraulic cement composition; (c) one or more getters packed into a homogeneous layer adjacent to a layer of packed hydraulic cement; and (d) two or more getter layers adjacent one or more hydraulic cement layers.

Figure 1:
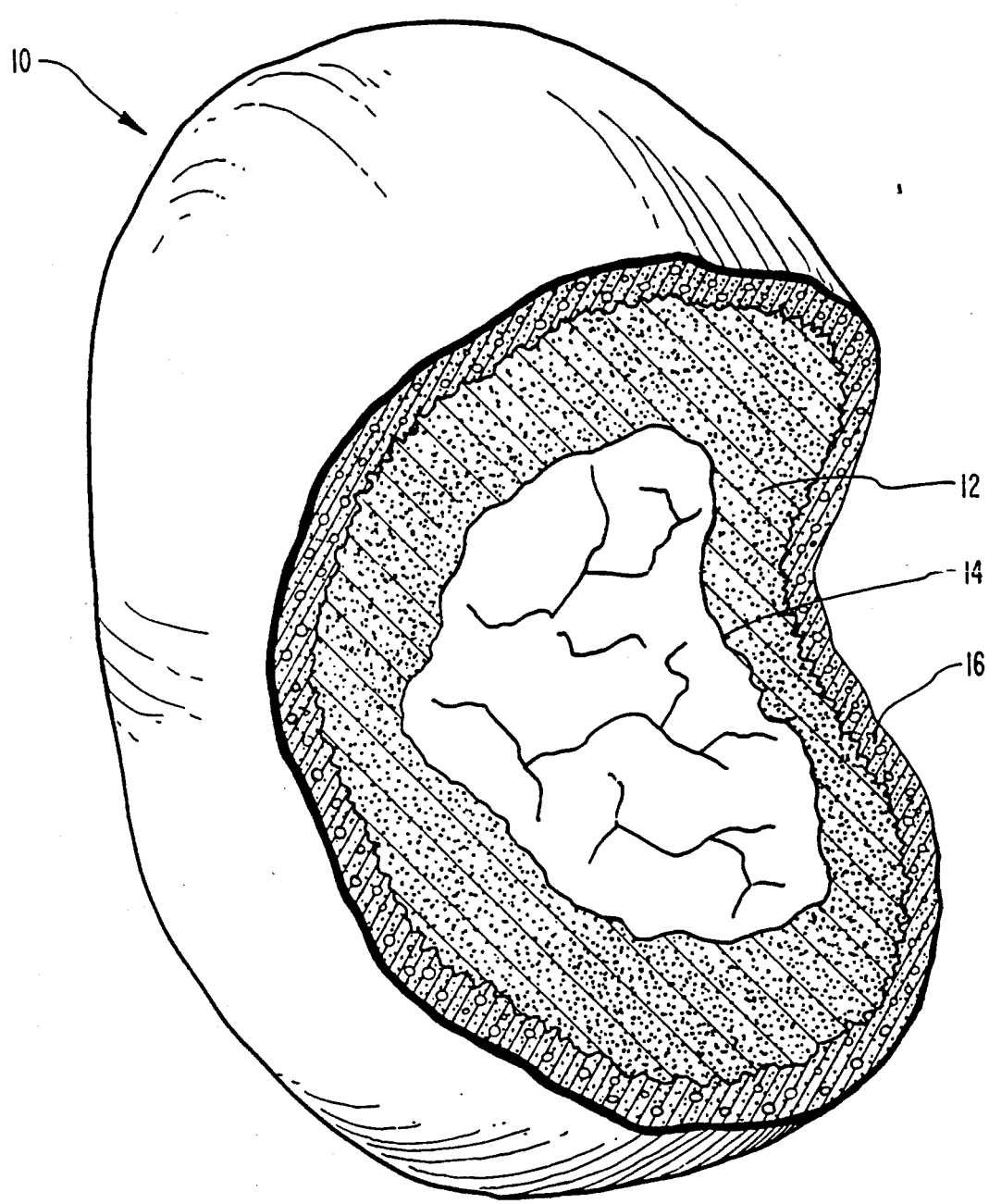
FIG. 1 is a partial cut-away perspective view of a waste container having walls that are contaminant barriers within the scope of the present invention.

Referring now to FIG. 1, one possible contaminant barrier within the scope of the present invention is illustrated in the form of a waste container. Waste container 10 includes a mixture 12 of at least one liquid, ion, or gas getter and powdered hydraulic cement. The mixture 12 is compressed around solid hazardous waste 14. The outer surface layer 16 of the cement mixture is subsequently hydrated.

The average thickness of outer surface layer 16 may vary from as little as 0.001 inches to as much as 100 inches. In most cases, the thickness will range from about 0.25 inches to about 3 inches. Desired strength characteristics often dictate the thickness of the hydrated outer surface layer. In some cases, natural water vapor in the atmosphere may hydrate a thin outer surface layer prior to depositing the waste container in an underground storage site. More complete hydration would then occur over the years as ground water contacts the waste container.

Although the waste container shown in FIG. 1 is generally spherical in shape, it will be appreciated that the waste containers within the scope of the present invention may be prepared in a variety of different shapes. For instance, triangular, rectangular, hexagonal, and many other geometric cross-sectional configurations may be used. These cross-sectional configurations enable waste containers to be packed together more efficiently than cylindrical waste containers for transportation and final storage of the waste containers.

Waste containers within the scope of the present invention may also be prepared by compressing powdered hydraulic cement around the solid hazardous waste and thereafter applying a layer of cement paste over the compressed powdered hydraulic cement. Aggregates, such as fibers, may be added to the powdered hydraulic cement or to the cement paste to provide desired mechanical properties.

It is also within the scope of the present invention to compress a getter layer containing one or more getters around waste material, compress a cement layer containing a powdered hydraulic cement composition around the getter layer, and then hydrate the cement composition. Any number of cement layers and getter layers can be included in such a containment system.

Figure 2:
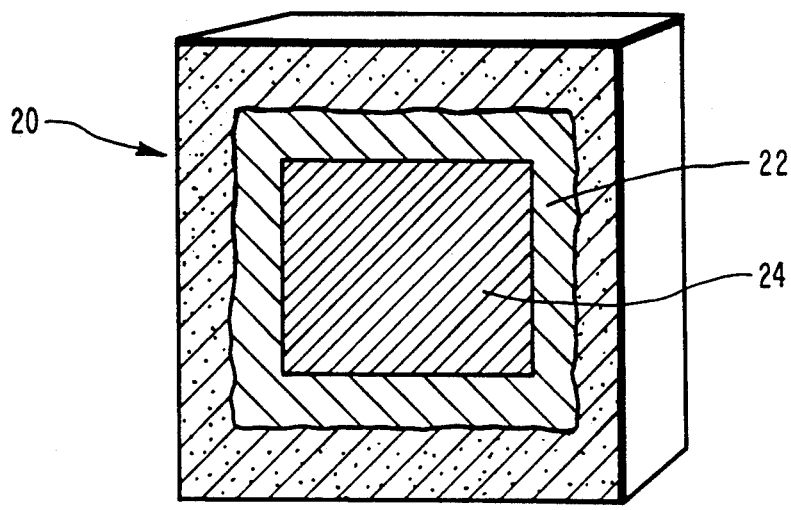
FIG. 2 is a cross-sectional perspective view of another waste container having walls that are contaminant barriers within the scope of the present invention showing a "getter" layer surrounding the waste material.

FIG. 2 illustrates one possible waste container 20 within the scope of the present invention having a getter layer 22 surrounding a quantity of waste material 24. Outer wall 26 includes substantially hydrated cement.

Figure 3:
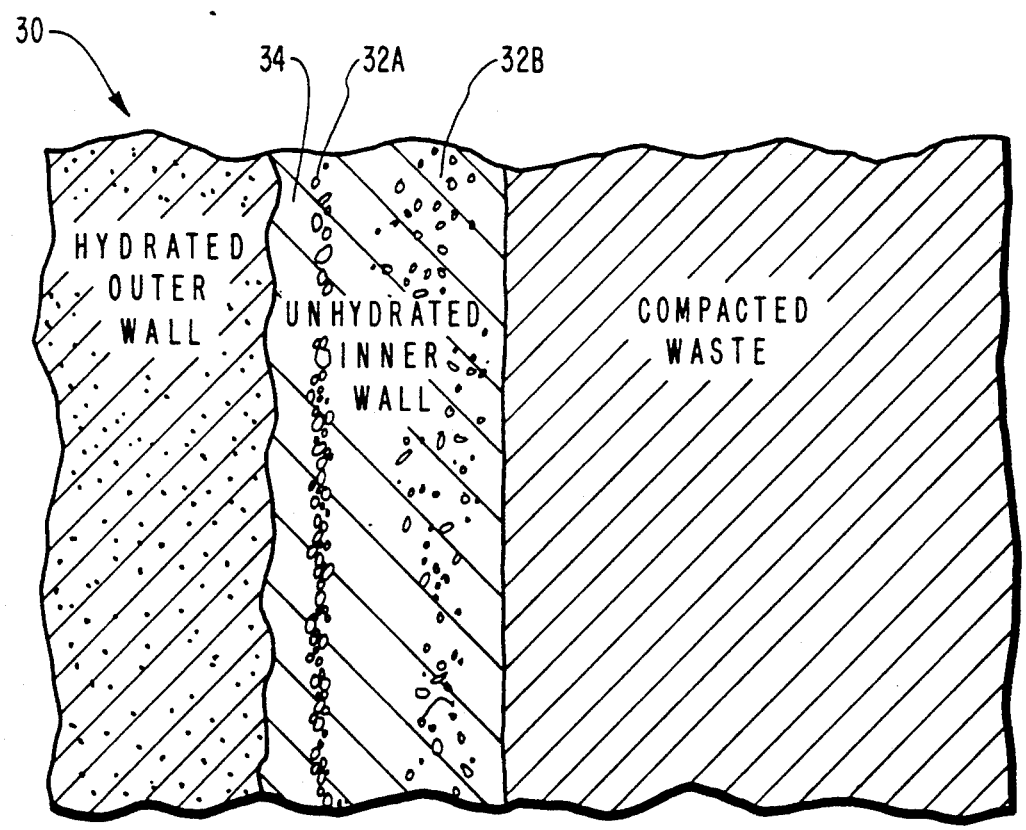
FIG. 3 is a partial cross-sectional view of another possible contaminant barrier within the scope of the present invention showing multiple "getter" layers surrounding the waste material.

FIG. 3 illustrates another possible cementitious contaminant barrier configuration 30 in which multiple layers of liquid, ion, or gas getters 32A and 32B are mixed within a hydraulic cement composition layer 34.

Contaminant barriers within the scope of the present invention may be prepared with a single barrier layer comprising a mixture of one or more liquid, ion, or gas getters and a hydraulic cement composition. The outer surface of this single layer would then be partially hydrated to provide mechanical strength.

Aggregates may also be incorporated into one or more hydraulic cement layers of the contaminant barriers within the scope of the present invention to obtain desired structural or mechanical characteristics.

In those embodiments in which the powdered hydraulic cement is compressed around the waste materials, the void space within the waste container is substantially reduced. The waste materials are essentially "pre-crushed" inside the container walls. In this pre-stabilized, high density, condition, the waste containers can be made so that the whole is much closer to equilibrium with the ground without the need for further compaction, grouting, or sealing.

In the case where the waste containers are buried in underground vaults, the fewer number of void spaces within the waste containers enables the ground to reach equilibrium density faster when the underground storage room collapses. In addition, the problems with ground water seeping into void spaces are reduced.

Figure 4:
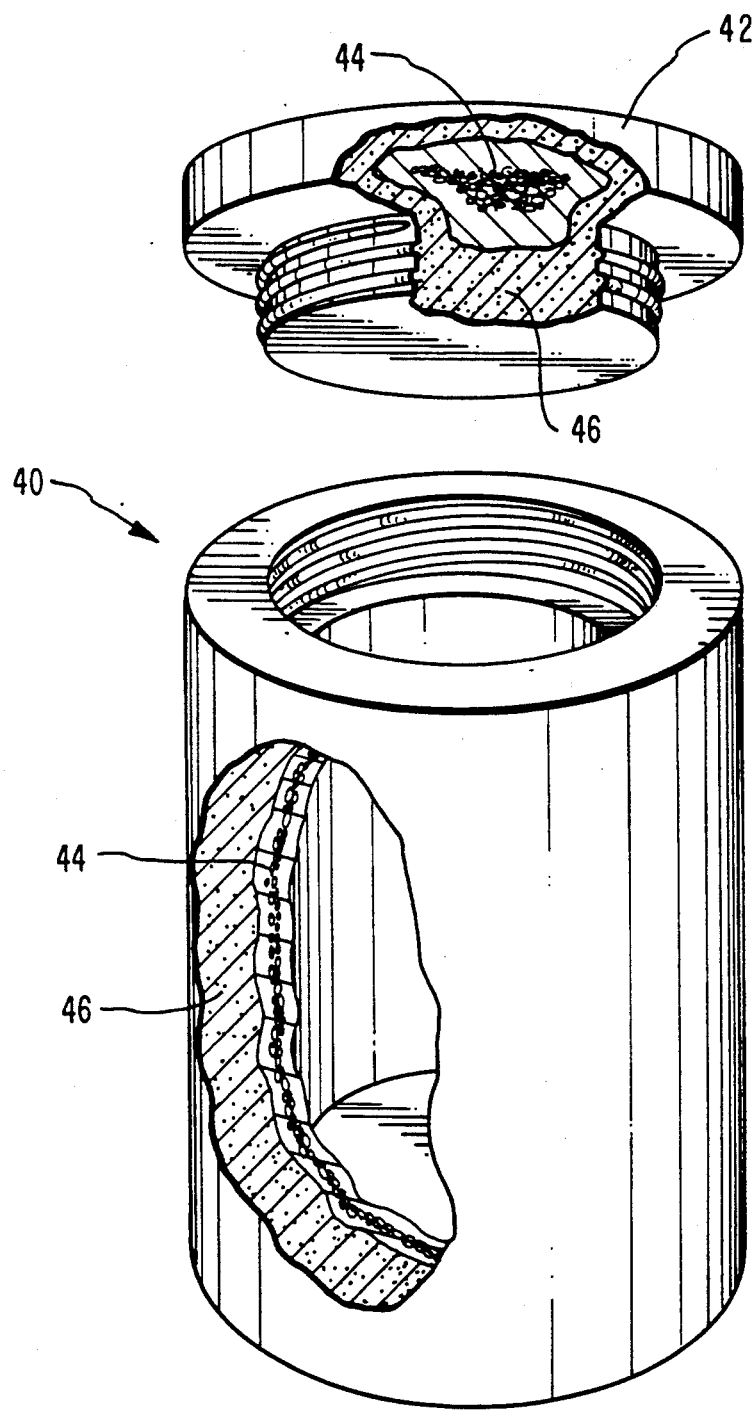
FIG. 4 is a partial cut-away perspective view of yet another waste container having walls that are contaminant barriers within the scope of the present invention.

It is also within the scope of the present invention to form a hollow waste container and later add the waste materials to the container. FIG. 4 illustrates another possible hazardous waste container within the scope of the present invention. The waste container 40 shown in FIG. 4 has a removable lid 42. The contaminant barrier forming the container wall includes a getter layer 44 having at least one liquid, ion, or gas getter. A layer of hydrated cement 46 provides mechanical strength to the waste container.

The lid 42 serves to seal the container after a quantity of hazardous waste is placed inside the container. The lid preferably includes a getter layer 44 to prevent passage of contaminants through the lid. It is anticipated that cement paste or mortar may be used to seal the lid 42 with the container 40. In this way, the lid and container are bonded together. The cement paste preferably includes the getters included within the container wall.

1. Liquid, Gas, and Ion Getters

According to the present invention, the cementitious contaminant barriers include at least one getter. As defined above, getters are materials which adsorb, absorb, chemically react, ionically bond, trap, attract, or otherwise bind to selected liquid, gases, or ions. The getters may be mixed with a powdered hydraulic cement composition prior to forming the contaminant barrier. In other cases, one or more getter layers may be used to form the contaminant barrier.

As applied to the present invention, getters, including zeolites, layered clays, and similar compounds, are included in the cementitious contaminant barrier to remove contaminants which might leach from waste material or otherwise penetrate the cementitious barrier. In those cases where many different types of contaminants may need to be isolated by the cementitious barrier, then more than one getter may be required to adequately contain the contaminants. A few examples of common getters which may be used in connection with the present invention are listed in Table 1.

TABLE 1

| Liquid, Ion, or Gas Getter | Liquid, Ion, or Gas |
|---|---|
| Unhydrated cement | $CO_2$, $H_2O$ |
| Zeolite A | Tl, Ag, Sr, Zn, Cd, Hg, Pb, Ba |
| Zeolite F | $NH_4^+$, nitrogen containing organics |
| Zeolite X | Fe, Cr, U, Lanthanides, Actinides |
| Zeolite AgX | Iodides, $CH_3I$, HI |
| Zeolite PbX | Iodides, $CH_3I$, HI |
| Zeolite Y | Organics, Ni, Co, Cr, Fe, transuranics |
| Chabazite (AW500) | Tl, K, Ag, Rb, $NH_4^+$, Pb, Na, Ba, Sr |
| Mordenite (Zeolon) | Cs, Co, Cr, Fe, $NO_x$ |
| Faujasite (Y) | Rare earths and transuranium, I |
| Clinoptilolite | $NH_4^+$, Sr, Cs |
| Silicalite | Organics |
| ZSM-5 | Organics |
| $Na_3PO_4$ | Di and trivalent ions |
| Zeolite/Pd,Cu,Ag | $H_2$ |
| $FeTi(H_x)$ | $H_2$ |
| $LaNi_5(H_x)$ | $H_2$ |
| $LaNi_{4.7}Al_{0.3}(H_x)$ | $H_2$ |
| $Ca(OH)_2$ | $CO_2$ |
| Kaolinite | Cs, Rb, polar organics |
| Smectite } Vermiculite } | Hg, Pb, Tl, Lanthanides, Actinides |
| Hydrotalcite | $SeO_4^{2-}$, $MoO_4^{2-}$, $V_{10}O_{28}^{6-}$, $Mo_7O_{24}^{6-}$, $CO_3^{2-}$, $I^-$ |
| Montmorillonite | $Na_xAl_{(2-x)}Mg_xSi_4O_{10}(OH)_2$, Pb, Cs, amines, benzene, alcohols, ketones, glycols, large functionalized organics |
| Mica (phlogopite) | Cs, Sr |

Zeolites are an important class of getters used within the scope of the present invention. Zeolites are aluminosilicate framework minerals having a general formula:

$$M_{x/n}^{+n}[Al_xSi_yO_{2x+2y}]^{-x} \cdot zH_2O$$

Where n is the cation valence. They are characterized by their open structures that permit exchange of ions or molecules. Both natural and synthetic zeolites find wide application as ion exchangers, adsorbents, and catalysts. The ion exchange and molecular sieve properties of zeolites make them important in a variety of filtering processes. One important use of zeolites is the removal of radioactive cesium and strontium from waters contaminated with these elements. Because of their differing structures, particular zeolites can be used as molecular sieves to capture molecules of different sizes and shapes.

As applied to the present invention, zeolites may also be used as getters for ions, liquids, organics, and gasses such as $H_2$ and $CO_2$. Mixtures of different zeolites and clays may be used to prevent a wide variety of different ions and molecules from escaping the waste container.

The following are a few common zeolites which may be used within the scope of the present invention:

Zeolite A has the following typical oxide formula: $Na_2O \cdot Al_2O_3 \cdot 2SiO_2 \cdot 4.5H_2O$. Zeolite A has a highly charged framework which will selectively adsorb thallium, silver, strontium, zinc, cadmium, mercury, lead, and barium over calcium. For example, $^{90}Sr$, a common nuclide in nuclear explosion fallout with a half life of 28 years is preferentially removed in the presence of calcium ions. This zeolite is not effective for trivalent ions.

Zeolite X has the following typical oxide formula: $Na_2O \cdot Al_2O_3 \cdot 2.5SiO_2 \cdot 6H_2O$. Zeolite X is preferred for higher valent ions such as iron, chromium, uranium, lanthanides, and actinides. The ion exchange of the actinides is irreversible if the temperature is above ~85° C. Neither Zeolite A nor Zeolite X is stable in acidic environments with protons as the cations.

Zeolite Y has the following typical oxide formula: $Na_2O \cdot Al_2O_3 \cdot 4.8SiO_2 \cdot 8.9H_2O$. Zeolite Y has more silicon in the framework (Si/Al~3). As a result, it is more stable in acidic conditions. Cation exchange tends to be faster but less complete than for zeolite X. The same cations can be exchanged. Aluminum can be removed from the framework to give increasingly acid stable structures, but with less ion exchange capacities. However, the higher silicon compositions selectively remove organics from water.

Chabazite has the following typical oxide formula: $CaO \cdot Al_2O_3 \cdot 4SiO_2 \cdot 6.5H_2O$. Chabazite is important because calcium is less selectively exchanged than for the above zeolites. For example, the following cation selectivity has been reported:

$$Tl^{30} > K^+ > Ag^+ > Rb^+ > NH_4^{30} > Pb^{2+} > Na^+ = Ba^{2+} > Sr^{2+} > Ca^{2+} > Li^{30}.$$

Chabazite can be made in the acid form.

Mordenite has the following typical oxide formula: $Na_2O \cdot Al_2O_3 \cdot 10SiO_2 \cdot 6H_2O$. Mordenite, also known as Zeolon, has been used to isolate cesium 137 and radioactive strontium ($^{90}Sr$). The hydrogen form selectively absorbs $NO_x$. Mordenite can be made in the acid form.

Clinoptilolite has the following typical oxide formula: $(Na_2,K_2)O \cdot Al_2O_3 \cdot 10SiO_2 \cdot 8H_2O$. Clinoptilolite has a strong preference for ammonium ions and also prefers strontium over calcium.

High silica content molecular sieves, such as silicalite and ZSM-5, may also be used in acidic environments. They do not have high exchange capacities for cations, but will adsorb organic molecules. Boron can be substituted for silicon to give a molecular sieve with a large neutron capture cross section. Arsenates, iodates, sulfides, sulfates, selenides, selenates, and fluorides are anions, and in general, will not be selectively adsorbed by zeolites unless they react with a cation, such as lead, which is already within the zeolite framework to form a substantially insoluble compound. These compounds can also be absorbed in hydrotalcite clays as well.

Mixtures of different zeolites may be used to absorb a wider variety of hazardous waste ions and gases than using a single zeolite or layered clay material. Mixtures of zeolites and/or clays can improve the efficiency of "getting" or sieving out specific hazardous substances. The following combinations of zeolites are a few currently preferred zeolite mixtures. It should be noted that due to the large concentrations of calcium present when the zeolite mixtures are combined with hydraulic cement compositions, it is possible a "mass action" effect could in some cases overwhelm the selectivity of the noted zeolites for other ions.

| Zeolite or Molecular Sieve | Ion or Gas |
|---|---|
| Combination A | |
| 1. Mordenite (Zeolon) | $^{137}Cs$ |
| 2. Chabazite (AW500) | Sr selectivity over Ca |
| 3. Faujasite (Y) | Rare earths and transuranium, Hg |
| 4. Linde 5A | Tl, Pb |
| Combination B | |
| 1. NaZSM5 (high silica) and/or Silicate (optional) | Organic residues |

| Zeolite or Molecular Sieve | Ion or Gas |
| --- | --- |
| 2. Zeolite X, Zeolite Y, or Zeolite A with H$_2$ "getter" | Organic radioactive thermal decomposition |
| 3. Clinoptilolite or Zeolite F (Linde) | NH$_3$/NH$_4{}^+$ decomposition from nitrogen residues. |
| 4. Linde 5A | Tl, Pb |
| Combination C | |
| 1. Zeolon (large pore mordenite) | $^{137}$Cs |
| 2. Zeolite X | $^{90}$Sr → Anorthite with vitrification |
| 3. Chabazite (AW500) | $^{90}$Sr |
| 4. Linde 5A | Tl, Pb |

Anorthite, referred to above, is known as an "early condensate." Early condensates are formed at high temperatures and subsequently suffer little loss by chemical change or decomposition. The terrestrial abundance of the early condensates is similar to their cosmic abundance. Examples include iron with 12% nickel, which condenses at 1500° K.; diopside, CaMgSi$_2$O$_6$, which condenses at 1450° K.; and anorthite, CaAl$_2$Si$_2$O$_8$, which condenses at 1350° K. It is for this reason that Fe, O, Mg and Si make up more than 90% of the earth. The elements Ca, Al, Ni and S add up to another 6 to 7 percent.

Zeolite X, one of the most open zeolites, can be easily exchanged with Ca or Sr and directly converted by vitrification to the very stable anorthite phase Ca(Sr)Al$_2$Si$_2$O$_8$. Selective exchange for Sr followed by condensation to anorthite at elevated temperatures may be a useful way to deal with $^{90}$Sr decay which generates considerable heat.

| Zeolite or Molecular Sieve | Ion or Gas |
| --- | --- |
| Combination D | |
| 1. Zeolon (large pore mordenite) | $^{137}$Cs |
| 2. Zeolite AgY | CH$_3$I, I$_2$, $^{129}$I |
| 3. Zeolite PbX | HI |
| 4. Linde 5A | Tl, Pb |

It will be appreciated that many other possible combinations of zeolites and clays may be used depending on the particular contaminants of interest and the desired barrier efficiency.

Layered Clays are another important class of getters used within the scope of the present invention. A common structural feature in the layered clays is one or more hexagonal sheets of linked MO$_4$ (M = Si, Al) tetrahedra and one or more sheets of linked M'O$_6$ (M' = Mg, Ca, Al, Fe) octahedra. These sheets are co-condensed in a variety of ways to form the various layered clays. The layered clays can be used to absorb large organic molecules, gases, cations, and even anions under certain conditions. Large molecules can be absorbed in layered clays because of the large pore openings in the layered structure. Layered clays have been used to trap highly toxic organic compounds such as dioxins.

The following are a few common layered clays which are typical of those used within the scope of the present invention:

Kaolinite has the following typical oxide formula: Al$_2$Si$_2$O$_5$(OH)$_4$. Kaolinite is a two-layered sheet clay composed of a SiO$_4$ tetrahedra sheet and an AlO$_6$ octahedra sheet which is useful for the absorption of polar organic molecules.

Smectite and Vermiculite has the following typical oxide formula: Al$_2$Si$_4$O$_{10}$(OH)$_2$. Smectite and Vermiculite have three layer sheets with one octahedra layer between two tetrahedral layers. Substitutions of Mg$^{2+}$, Ca$^{2+}$, and Fe$^{3+}$ for aluminum can be used to change the charge of the framework and structural features.

Hydrotalcite has the following typical oxide formula: (Mg$_4$Al$_2$(OH)$_{12}$)A$^n-$ (A$^{n-}$ = anion). Hydrotalcite is an unusual anion exchanger clay which can be modified to adsorb various negatively charged ions. The anions can be large metal oxide anionic aggregates, simple inorganic anions such as selenate (SeO$_4{}^{2-}$) or organic in nature.

Some gas getters may be specifically included within the contaminant barriers of the present invention for the purpose of trapping certain gasses that might be generated by waste materials. Gaseous formation of hydrogen and carbon dioxide from organics and metals in radioactive and other hazardous wastes and waste containers is a serious problem. Of course, unhydrated cement will act as a CO$_2$ getter, but some zeolites such as hydroxy cancrinite, and some nonzeolite compounds such as hydrotalcite clays may also be included in the hazardous waste container to function as CO$_2$ getters.

Zeolites impregnated with palladium may be used to adsorb and remove hydrogen gas. Palladium is one of the most effective hydrogen getters known in the art. Other compounds such as FeTi(H$_x$) and LaNi$_5$(H$_x$) are also good hydrogen getters at high pressure. FeTi(H$_{1.2}$) is formed by trapping 0.1 grams H$_2$/ml which is greater than the density of liquid hydrogen (0.07 grams H$_2$/ml). LaNi$_5$(H$_6$) is formed by trapping 0.09 grams H$_2$/ml.

2 Engineering the Cementitious Contaminant Barrier

Before selecting specific getters to be included in a cementitious contaminant barrier, the waste material to be contained must be identified. The waste material is preferably assayed and characterized to determine the nature and quantity of contaminants per unit mass. For example, a low-level radioactive waste form may consist of 50 liters of soil containing only 1 gram of mercury or radioactive cesium that causes the entire mass to be classified as hazardous.

Specific hazardous materials that have a particularly high toxicity and/or a propensity or probability of diffusion or leaching through the containment barrier are preferably further identified and characterized. The potential of generating and diffusing or leaching a maximum amount of each contaminant of interest per unit mass of waste is determined.

A cementitious contaminant barrier is then engineered and fabricated with one or more getters disbursed therein (either randomly or in layers) having the capacity of trapping the maximum quantity of potential contaminants of interest. Thus, getters are selected for inclusion in cementitious contaminant barrier depending on the type and quantity of contaminants for which there is concern of diffusion or leaching through the barrier.

Once the getter is selected, the amount of the getter necessary to trap specific contaminants must be calculated. It will be appreciated that those skilled in the art would be capable of calculating the amount getter required by taking into consideration the molecular or formula weight of the getter, the amount of potential contaminant, and the getter efficiency. The ultimate fabrication method and design based used will depend upon the economics of fabrication which include the manufacturing process costs and the getter costs.

The following examples are offered to illustrate how to calculate the amount of getter to be included in a cementitious barrier in order to trap a given amount of contaminant material. These examples are intended to be purely exemplary and should not be viewed as a limitation on any claimed embodiment.

EXAMPLE 1

This example calculates the amount of hydrogen getter required to absorb hydrogen generated by five kilograms of hazardous waste material within 10 cubic feet of mass. It is assumed the hazardous waste material is 5% hydrogen by weight. The hydrogen gas ($H_2$) is preferably converted to a stable hydride or hydroxide at low temperature. One possible mechanism for converting the $H_2$ is the use of palladium and/or silver cations highly dispersed in a zeolitic framework.

The palladium is preferably loaded into the zeolite by ion exchange as $Pd(NH_3)_4^{+2}$. All molecular sieves or zeolites containing ten or twelve rings (channel openings with ten or twelve oxygen atoms coordinated to ten or twelve main group element atoms, respectively) are suitable for this method of exchange. For smaller pore zeolites, ion exchange using aqueous solutions of halide salts of palladium or dry impregnation (incipient wetness) is used. Coexchange with transition metals such as cobalt or iron is used to enhance the dispersion of the palladium(0) phase.

In this example, sodium zeolite Y, $Na_{56}(AlO_2)_{56}(SiO_2)_{136}$, is prepared by conventional hydrothermal crystallization (see D. W. Breck and E. M. Flanigen, "Molecular Sieves," *Soc. Chem. Ind.*, London 1968), p. 47 and H. Kacirek and H. Lechert, *J. Phys. Chem.* 1975, vol. 79, p. 1589) or purchased commercially (Linde LZ-Y52). After aqueous cation exchange with $Pd(NH_3)_4^{+2}$ (0.01M) the zeolite sample is washed, filtered, and subsequently dehydrated in a flow of oxygen (570°–870° K.) at a heating rate of 1° K./min to form the active absorber.

The prepared zeolite has the following chemical analysis: $Pd_{13.7}Na_{28.5}[(AlO_2)_{56}(SiO_2)_{136}]$, Formula Weight, 13589. With 5000 gm hazardous waste which is 5% hydrogen (250 gms), 250 moles of hydrogen atoms are potentially generated. One mole of the above molecular sieve contains 13.7 moles of $Pd^{2+}$ which will potentially convert 27.4 moles of hydrogen atoms to hydrogen ions. Assuming an efficiency of 50%, then 250/13.7=18.3 moles or 248.7 kg of zeolite are needed to convert the hydrogen. This corresponds to 106.4 * 250=26.6 kg of palladium are needed.

EXAMPLE 2

This example calculates the amount of hydrogen getter required to absorb hydrogen generated by five kilograms of hazardous waste material within 10 cubic feet of mass according to the procedure of Example 1, except that iron or cobalt is further substituted for the sodium in the sodium zeolite Y. This has been demonstrated to increase the room temperature reactivity of palladium with hydrogen (see Karin Moller and Thomas Bein, *J. Phys. Chem.* 1990, vol. 84, p. 845; K. Moller and T. Bein, "Studies in Surface Science and Catalysis, Zeolite: Facts, Figures, Future," P. A. Jacobs and R. A. van Santen, Eds., Elsevier, Amsterdam, Vol. 49, p. 985, 1989).

The zeolite is first exchanged with iron, then dehydrated under oxygen at 623° K. under oxygen, and then ion exchanged with $Pd(NH_3)_4^{+2}$ (0.01M). Alternatively, ion exchange procedure can be reversed. The resulting zeolite has the following chemical analysis: $Na_{29}Fe_{3.8}Pd_{10}AlO_2)_{56}(SiO_2)_{136}$ (Formula weight 13418). With the same assumptions as in Example 1, 25 moles or 335.5 kg of zeolite containing the same amount of palladium (26.6 kg) is required to convert the hydrogen.

EXAMPLE 3

This example calculates the amount of hydrogen getter required to absorb hydrogen generated by five kilograms of hazardous waste material within 10 cubic feet of mass according to the procedure of Example 1, except that silver and copper exchanged zeolites are used. The silver zeolitic phase undergoes reduction with hydrogen below 100° C. (see H. K. Beyer and P. A. Jacobs in "Metal Microstructures in Zeolites", ed. P. A. Jacobs, et al., Elsevier, Amsterdam, p. 95, 1982.) The copper zeolite is reduced below 200 C, although the lower limit is not well established. This is readily done with small pore size zeolites, such as zeolite A, as well as zeolite X or Y. $Ag_{12}[AlO_2)_{12}(SiO_{12})]$, zeolite A, or $Ag_{36}Cu_{10}(AlO_2)_{56}(SiO_2)_{136}$, zeolite Y, compositions can be used. The latter has a formula weight of 15997. For conversion of 250 moles of hydrogen, 500/36=13.9 moles (222.2 kg) of zeolite are required at 50% efficiency. In this case, the copper may assist in the reduction, but has not been included as a backup factor. The amount of silver needed is 500 moles or 53.95 kg.

EXAMPLE 4

This example calculates the amount of ion getter required to absorb mercury contained in five kilograms of hazardous waste material within 10 cubic feet of mass. It is assumed the hazardous waste material contains 1% $Hg^{2+}$. In this example, sodium zeolite A is prepared by conventional hydrothermal crystallization or purchased commercially (Linde 5A). Sodium zeolite A has the following typical oxide formula: $Na_2O.Al_2O_3.2SiO_2.4.5H_2O$, with a formula weight of 365. One mole of the above molecular sieve contains one mole of $Na_2O$ which will potentially be replaced by one mole of $Hg^{2+}$. Assuming an efficiency of 50%, then (0.25 moles $Hg^{2+}$)/(0.5 moles $Hg^{2+}$ converted per mole zeolite A)=0.5 moles or 182.5 grams of zeolite A are needed to convert the mercury.

3. Powdered Hydraulic Cements

The family of cements known as hydraulic cements used in the present invention is characterized by the hydration products that form upon reaction with water. It is to be distinguished from other cements such as polymeric organic cements. The term powdered hydraulic cement, as used herein, includes clinker, crushed, ground, and milled clinker in various stages of pulverizing and in various particle sizes. The term powdered hydraulic cement also includes cement particles which may have water associated with the cement; however, the water content of the powdered hydraulic cement is preferably sufficiently low that the cement particles are not fluid. The water to cement ratio is typically less than about 0.25.

Examples of typical hydraulic cements known in the art include the broad family of Portland cements (including ordinary Portland cement without gypsum), calcium aluminate cements (including calcium aluminate cements without set regulators, e.g., gypsum), plasters, silicate cements (including β dicalcium silicates, tricalcium silicates, and mixtures thereof), gypsum cements, phosphate cements, magnesium oxychloride cements, as well as mixtures of hydraulic cements.

Hydraulic cements generally have particle sizes ranging from 0.1 μm to 100 μm. The cement particles may be gap-graded and recombined to form bimodal, trimodal, or other polymodal systems to improve packing efficiency. For example, a trimodal system having a size ratio of 1:5:25 and a mass ratio of 21.6:9.2:69.2 (meaning that 21.6% of the particles, by weight, are of size 1 unit and 6.9% of the particles, by weight, are of size 5 units and 69.2% of the particles, by weight are of size 25 units) can theoretically result in 85% of the space filled with particles after packing.

Another trimodal system having a size ratio of 1:7:49 and a mass ratio of 13.2:12.7:66.1 can result in 88% of the space filled with particles after packing. In yet another trimodal system having the same size ratio of 1:7:49 but a different mass ratio of 11:14:75 can result in 95% of the space filled with particles after packing. It will be appreciated that other particle size distributions may be utilized to obtain desired packing densities.

A bimodal system having a size ratio of 0.2:1 and a mass ratio of 30:70 (meaning that 30% of the particles, by weight, are of size 0.2 units and 70% of the particles, by weight, are of size 1 unit) can theoretically result in 72% of the space filled with particles after packing. Another bimodal system having a size ratio of 0.15:1 and a mass ratio of 30:70 can result in 77% of the space filled with particles after packing.

4. Pressure Compaction Processes

Many of the general principles regarding pressure compaction of powdered hydraulic cement as well as various techniques for hydrating packed hydraulic cement are discussed in copending patent application Serial No. 07/526,231, filed May 18, 1990, in the names of Hamlin M. Jennings and Simon K. Hodson and entitled "HYDRAULICALLY BONDED CEMENT COMPOSITIONS AND THEIR METHODS OF MANUFACTURE AND USE," which was incorporated reference above.

The compressing of powdered hydraulic cement within the scope of the present invention is not to be confused with prior art processes which mold and shape cement pastes. As used herein, the term "cement paste" includes cement mixed with water such that the hydration reaction has commenced in the cement paste. Cement pastes are continuous, fluid mixtures having a measurable viscosity.

Pressure compaction processes, such as dry pressing and isostatic pressing, may be used to compress powdered hydraulic cement and getters in the form of waste containers described above. Dry pressing consists of compacting powders between die faces in an enclosed cavity. Pressures can range from about 500 psi to greater than 100,000 psi in normal practice.

In some cases, additives are mixed with the powdered hydraulic cement to make molding easier and to provide sufficient strength so that the article does not crumble upon removal from the press. Suitable additives preferably neither initiate hydration nor inhibit later hydration of the hydraulic cement.

Grading the cement particles and getters, as discussed above, may also provide a certain fluidity to the cement powder and getters during compressing. Because cement particles are formed by crushing and grinding larger cement clinker pieces, the individual particles have rough edges. Rounding the edges of the cement particles enhances their ability to slide over each other, thereby improving the packing efficiency of the cement particles. Techniques for rounding cement particles known in the art may be used.

Some of the air enclosed in the pores of the loose cement powder and getter has to be displaced during pressing. The finer the mix and the higher the pressing rate, the more difficult the escape of air. The air may then remain compressed in the mix. Upon rapid release of the pressure, the pressed piece can be damaged by cracks approximately perpendicular to the direction of pressing. This pressure lamination, even though almost imperceptible, may weaken the resulting product. This problem is usually solved by repeated application of pressure, by releasing the pressure more slowly, or by creating a vacuum before pressing.

Isostatic pressing is another powder pressing technique in which pressure is exerted uniformly on all surfaces of the cement article being formed. The method is particularly suitable in forming of symmetric shapes, and is similarly employed in the shaping of large articles which could not be pressed by other methods. In practice, the powdered mix is encased in a pliable rubber or polymer mold. The mold is then preferably sealed, evacuated to a pressure between 0.1 atm and 0.01 atm, placed in a high-pressure vessel, and gradually pressed to the desired pressure. An essentially noncompressible fluid such as high-pressure oil or water is preferably used. Pressures may range from 1000 psi to 100,000 psi. The forming pressure is preferably gradually reduced before the part is removed from the mold.

Vibrational compaction techniques, as described more fully in copending patent application Ser. No. 07/526,231, may be used to help pack the hydraulic cement composition and getter into molds and into in situ barrier configurations. In vibrational compaction processes, the powdered hydraulic cement particles and getter particles are typically compacted by low-amplitude vibrations. Inter-particle friction is overcome by application of vibrational energy, causing the particles to pack to a density consistent with the geometric and material characteristics of the system and with the conditions of vibration imposed.

Packed densities as high as 100% of theoretical are possible using vibration packing processes. As used herein, the term "theoretical packing density" is defined as the highest conceivable packing density achievable with a given powder size distribution. Hence, the theoretical packing density is a function of the particle size distribution. Vibration packing processes may also be combined with pressure compaction processes to more rapidly obtain the desired packing densities or even higher packing densities.

Typical vibration frequencies may range from 1 Hz 20,000 Hz, with frequencies from about 100 Hz to about 1000 Hz being preferred and frequencies from about 200 Hz to about 300 Hz being most preferred. Typical amplitudes may range from about one half the diameter of the largest cement particle to be packed to about 3 mm, with amplitudes in the range from about one half the diameter of the largest cement particle to about 1 mm. If the amplitude is too large, sufficient packing will not occur.

Once the amplitude is determined, the frequency may be varied as necessary to control the speed and rate of packing. For particle sizes in the range from 0.1 μm to 50 μm, the vibration amplitude is preferably in the range from about 10 μm to about 500 μm. Although it is not necessary to have a specific particle size distribution in order to successfully use vibrational compaction processes, carefully grading the particle size distribution usually improves compaction.

5. Aggregates and Composite Materials

It is within the scope of the present invention to include aggregates commonly used in the cement industry with the powdered hydraulic cement prior to hydration. Examples of such aggregates include sand, gravel, pumice, perlite, and vermiculite. One skilled in the art would know which aggregates to use to achieve desired characteristics in the final cementitious waste container.

For many uses it is preferable to include a plurality of differently sized aggregates capable of filling interstices between the aggregates and the powdered hydraulic cement so that greater density can be achieved. In such cases, the differently sized aggregates have particle sizes in the range from about 0.01 μm to about 2 cm.

In addition to conventional aggregates used in the cement industry, a wide variety of other fillers, fibers, and strengtheners, including balls, filings, pellets, powders, and fibers such as graphite, silica, alumina, fiberglass, polymeric fibers, and such other fibers typically used to prepare composites, may be combined with the powdered hydraulic cement prior to hydration.

It is also within the scope of the present invention to use frozen ice and dry ice as aggregates, which upon hydration of the hydraulic cement composition, leave voids dispersed throughout the waste container. The voids act as crack attenuators and improve ductility. The use of ice, dry ice, and other similar aggregates in cement compositions is discussed in greater detail in copending patent application Ser. No. 07/565,602 which is incorporated herein by specific reference.

6 Cement Hydration Techniques a. Cement Hydration in General

The term hydration as used herein is intended to describe the chemical reactions that take place between the cement and water. The chemistry of hydration is extremely complex and can only be approximated by studying the hydration of pure cement compounds. For simplicity in describing cement hydration, it is often assumed that the hydration of each compound takes place independently of the others that are present in the cement mixture. In reality, cement hydration involves complex interrelated reactions of the each compound in the cement mixture.

With respect to Portland cement, the principal cement components are about 55% tricalcium silicate ($3CaO.SiO_2$, also referred to as $C_3S$), about 25% dicalcium silicate ($2CaO.SiO_2$, also referred to as $C_2S$), about 10% tricalcium aluminate ($3CaO.Al_2O_3$, also referred to as $C_3A$), and about 8% tetracalcium aluminoferrite ($4CaO.Al_2O_3.Fe_2O_3$, also referred to as $C_4AF$). In addition, some minor components are also present in Portland cement.

The hydration reaction of the two silicates with water produces calcium silicate hydrates (C-S-H) and calcium hydroxide. The C-S-H make the largest contribution to the strength of the hydrated cement. Tricalcium aluminate also forms a hydrate, but it contributes little to the strength of the cement. Moreover, the hydration reaction of tricalcium aluminate is so rapid that it has to be controlled by gypsum. The presence of tricalcium aluminate is, however, advantageous in the preparation of Portland cement. Tetracalcium aluminoferrite is not particularly important except that it contributes to the characteristic gray color of Portland cement. If a white cement is desired, the presence of tetracalcium aluminoferrite has to be kept down to about 1 percent.

On first contact with water, C and S dissolve from the surface of each $C_3S$ grain, and the concentration of calcium and hydroxide ions rapidly increases. The pH rises to over 12 in a few minutes. The rate of this hydrolysis slows down quickly but continues throughout a dormant period. After several hours under normal conditions, the hydration products, CH and C-S-H, start to form rapidly, and the reaction again proceeds rapidly. Dicalcium silicate hydrates in a similar manner, but is much slower because it is a less reactive compound than $C_3S$. For additional information about the hydration reactions, reference is made to F. M. Lea, *Chemistry of Cement and Concrete*, 3rd edition, pp. 177-310 (1970).

It has been observed that the better the contact between individual cement particles both before and during hydration, the better the hydration product and the better the strength of the bond between the particles. Hence, the positioning of cement particles in close proximity one to another before and during hydration plays an important role in the strength and quality of the final cementitious waste container.

b. Hydration With Gaseous and Liquid Water

It is within the scope of the present invention to hydrate the powdered hydraulic cement after the cement particles have been compressed into a hazardous waste container. Hydration is accomplished without mechanical mixing of the cement and water. Thus, diffusion of water (both gaseous and liquid) into the compressed hazardous waste container is an important hydration technique within the scope of the present invention.

In most cases, hydration occurs immediately after the container is compressed. In other cases, initial hydration may occur from water vapor in the atmosphere, with a more complete hydration occurring from ground water exposure after the container is placed in underground storage.

When hydration is achieved by contacting the cementitious waste container with gaseous water, the gas may be at atmospheric pressure; however, diffusion of the water into the article, and subsequent hydration, may be increased if the gaseous water is under pressure. The pressure may range from 0.001 torr to about 2000 torr, with pressures from about 0.1 torr to 1000 torr being preferred, and pressures from about 1 torr to about 50 torr being most preferred. Even though water vapor is introduced into the cement compact, it is possible that the water vapor may immediately condense into liquid water within the pores of the cement compact. If this happens, then gaseous water and liquid water may be functional equivalents.

Atomized liquid water may, in some cases, be used in place of gaseous water vapor. As used herein, atomized water is characterized by very small water droplets, whereas gaseous water is characterized by individual water molecules. Gaseous water is currently preferred over atomized water under most conditions because it can permeate the pore structure of the compressed cementitious container better than atomized water.

The temperature during hydration can affect the physical properties of the hydrated cement container. Therefore, it is important to be able to control and monitor the temperature during hydration. Cooling the cement container during hydration may be desirable to control the reaction rate.

The gaseous water may also be combined with a carrier gas. The carrier gas may be reactive, such as carbon dioxide or carbon monoxide, or the carrier gas may be inert, such as argon, helium, or nitrogen. Reactive carrier gases are useful in controlling the morphology and chemical composition of the final cementitious container. Reactive carrier gases may be used to treat the hazardous waste container before, during, and after hydration.

The partial pressure of the water vapor in the carrier gas may vary from about 0.001 torr to about 2000 torr, with 0.1 torr to about 1000 torr being preferred, and 1 torr to about 50 torr being most preferred. An autoclave may be conveniently used to control the gaseous environment during hydration. It is also possible to initially expose the cement container to water vapor for a period of time and then complete the hydration with liquid water. In addition, the cement container may be initially exposed to water vapor and then to carbon dioxide.

Heating the gaseous water will increase the rate of hydration. Temperatures may range from about 25° C. to about 200° C. It should be noted that the temperature at which hydration occurs affects certain physical characteristics of the final cement container, especially if an additional silica source is added. For example, when hydration temperature is greater than 50° C., the formation of a hydrogarnet crystalline phase is observed, and when the hydration temperature is greater than 85° C. other crystalline phases are observed.

These crystalline phases, which often weaken the cement structure, are not always desirable. However, in some cases, the pure crystalline phases may be desired. In order to form the pure crystalline phase, it is important to use pure starting materials and to accurately control the hydration temperature. It should be remembered that obtaining a contaminant barrier with high chemical and structural stability may be more important than obtaining mechanical strength when hydrating the powdered hydraulic cement.

c. The Effect of Carbon Dioxide on Hydration

The inventors have found that when carbon dioxide is introduced during the stages of hydration, significant structural benefits can be realized, such as high strength and reduced shrinkage on drying. These concepts are disclosed in copending patent application Ser. No. 07/418,027, filed Oct. 10, 1989, entitled PROCESS FOR PRODUCING IMPROVED BUILDING MATERIAL AND PRODUCT THEREOF, which is incorporated herein by specific reference.

More specifically, as applied to the cementitious contaminant barrier within the scope of the present invention, it has been found that $CO_2$ can be used to prepare contaminant barriers having improved water resistance, surface toughness, and dimensional stability. These results may be obtained by exposing the contaminant barrier to an enriched $CO_2$ atmosphere while rapidly desiccating the cement container. For best results, the $CO_2$ is preferably at a partial pressure greater than its partial pressure in normal air.

d. Control of the Aqueous Solution

Aqueous solutions may also be used to hydrate the cementitious contaminant barriers and containers within the scope of the present invention. As used herein, the term aqueous solution refers to a water solvent having one or more solutes or ions dissolved therein which modify the hydration of hydraulic cement in a manner different than deionized water. For instance, it is possible to simply immerse the unhydrated cement container in lime water to achieve adequate hydration. Lime water is an aqueous solution containing $Ca^{2+}$ and $OH^-$ ions formed during the hydration reactions. Because of the presence of hydroxide ions, lime water typically has a pH in the range from about 9 to about 13.

Other aqueous solutions, such as extracts from cement paste, silica gel, or synthetic solutions may be used to hydrate the contaminant barriers of the present invention. Other ions in addition to $Ca^{2+}$ and $OH^-$, such as carbonates, silica, sulfates, sodium, potassium, iron, and aluminum, may also be included in aqueous phase solutions. In addition, solutes such as sugars, polymers, water reducers, and superplasticizer may be used to prepare aqueous solutions within the scope of the present invention.

A typical aqueous solution within the scope of the present invention may contain one or more of the following components within the following ranges:

| Component | Concentration (ppm) | Most Preferred Concentration (ppm) |
|---|---|---|
| calcium | 50–3000 | 400–1500 |
| silicon | 0–25 | 0.25–5 |
| carbon | 0–5000 | 5–250 |
| iron | 0.001–10 | 0.01–0.2 |
| aluminum | 0.001–10 | 0.01–0.2 |
| sulfur | 0–5000 | 200–2000 |
| sodium | 0–2000 | 400–1500 |
| potassium | 0–4000 | 800–2000 |
| sugars | sdr | sdr |
| polymers | sdr | sdr |
| water reducers | sdr | sdr |
| superplasticizer | sdr | sdr |

Where the term "sdr" refers to the standard dosage rate used in the concrete industry, and where the term "ppm" means the number of component atoms or molecules containing the component compound per million molecules of water. Apparatus capable of monitoring the concentrations of ions in the aqueous solution include pH meters and spectrometers which analyze absorbed and emitted light.

e. Addition of Hydrated Crystals

It is also within the scope of the present invention to provide the water necessary for hydration from compounds which release water upon mild heating. For instance, many compounds which contain water in a crystalline form, such as gypsum (a hydrated calcium sulphate, $CaSO_4.2H_2O$), ettringite (a calcium sulphoaluminate, $3CaO.Al_2O_3.3CaSO_4.31H_2O$), zeolites and layered clays containing water, and various hydrated crystals such as $Na_2CO_3.10H_2O$, release water when heated to temperatures in the range from about 60° C. to about 120° C.

These water-containing compounds are preferably added to the powdered hydraulic cement prior to forming the cementitious contaminant barrier. Subjecting the contaminant barrier to mild heating, typically less than about 100° C., causes water to be released. The water is then capable of partially hydrating the hydraulic cement. High green strengths are obtained using this technique. Cementitious contaminant barriers formed in this manner would also be excellent water getters.

7. Examples of Cementitious Barriers

Various cementitious contaminant barriers and their method of manufacture within the scope of the present invention will be further clarified by a consideration of the following examples, which are intended to be purely exemplary of the use of the invention and should not be viewed as a limitation on any claimed embodiment.

EXAMPLE 5

In this example, an engineered waste container having a contaminant barrier was prepared. A waste material was identified that had the potential of generating 0.1 moles of hydrogen gas per kilogram of waste by way of oxidation of iron. Twenty kilograms of the waste (having a unit density of 2.0 grams/cm$^3$) was selected to be contained in a preformed containment system with a separate lid. The container was manufactured to have an interior capacity of 10 liters. The container was in the shape of a box having an interior dimension of approximately 22 centimeters per side. 7.3 kilograms of ordinary Portland cement was combined in a dry powder mixer with 300 grams of $LaNi_{4.7}Al_{0.3}$. The $LaNi_{4.7}Al_{0.3}$ has the capacity to absorb up to three moles of hydrogen gas under ambient conditions.

The resultant dry powder mixture was placed in a mold. The mold had a latex exterior with an inside steel cubic mandrel having a cross section of 22×22 centimeters. The cement/$LaNi_{4.7}Al_{0.3}$ mixture was placed within the latex mold. The mold was then sealed and placed in an isostatic press and pressurized to 30,000 psi for 30 seconds and released.

After removing the "green" container from the mold, it was then immersed in water for 15 minutes, removed, and allowed to cure or hydrate for 24 hours. The containment wall was approximately 1 centimeter thick and had a rated flexural strength of greater than 10,000 psi. The waste was then placed inside, the lid was placed on top and sealed with cement paste as a bonding agent having a 0.30 water to cement ratio and including 5% $LaNi_{4.7}Al_{0.3}$.

EXAMPLE 6

In this example, an engineered waste container having a contaminant barrier is prepared. A waste material is identified that has the potential of generating 0.1 moles of hydrogen gas per kilogram of waste by way of oxidation of iron. One hundred (100) kilograms of the waste, having a unit density of 2.0 grams/cm$^3$ are selected to be contained in a preformed containment system with a separate screw lid. The container is manufactured to have an interior capacity of 50 liters. The preformed container is designed to be a cylinder with an interior diameter of 21 centimeters and an interior height of 36 centimeters. It is further designed to have an outside diameter of 23 centimeters and an overall height of 38 centimeters. The container is also designed to have a nearly homogenized layer of $LaNi_{4.7}Al_{0.3}$, a hydrogen gas getter, approximately 0.1 centimeter thick on the interior of the container.

The container is formed using the following procedure: An appropriate mold and mandrel having a cross-section of 21 centimeters is selected. 1500 grams of $LaNi_{4.7}Al_{0.3}$ having an average particle size of 5 microns are uniformly placed in the mold and isostatically pressed to 10,000 psi. The mold is then released, a larger mold housing is selected, and 21.2 kilograms of ordinary white Portland cement are uniformly placed in the mold. The mold and contents are then vibrated for one minute and evacuated. The mold is then sealed and isostatically pressed to 30,000 psi.

The "green" container has a total wall thickness of approximately 1.1 centimeters with an interior diameter of 21 centimeters. The container is placed in a chamber which is subsequently evacuated and backfilled with an aqueous solution. The aqueous solution is extracted from cement paste prepared with ordinary Portland cement having a water to cement ratio of 1.0. The container is then allowed to cure for 24 hours. Once the container has cured, the waste material is placed in the container, the preformed screw lid is coated with a 0.3 water to cement ratio cement paste containing 5% $LaNi_{4.7}Al_{0.3}$, and the lid is screwed into place.

EXAMPLE 7

In this example, an engineered waste container having a contaminant barrier was prepared. A waste material was identified that had the potential of generating 0.2 moles of $NH_4^+$ and leaching a maximum of 0.1 moles of mercury per kilogram of waste. Ten kilograms of this waste were to be contained. The waste had an average density of 1.6 grams/cm$^3$ after compaction to 20,000 psi. The container was designed to have 400 grams of zeolite A and 850 grams of zeolite F mixed with 4500 grams of ordinary Portland cement.

A mold was selected having a cubic shape with an interior dimension of 18 centimeters and an exterior diameter of 20 centimeters. The 10 kilograms of waste were placed in the interior cavity of the mold and 5750 grams of uniformly blended powder were evenly distributed in the exterior cavity of the mold and pressurized to 20,000 psi. Ultrasonic measurement indicated that the resultant container had a uniform cementitious wall of approximately one centimeter. The "green" container wall was formed to an engineered voids content of 19%.

The container was hydrated by initially spraying the entire container with an aqueous solution of water, CaOH, and $SiO_2$. Subsequently, approximately one-third liter of aqueous solution was uniformly sprayed on the exterior of the container in order to create a hydrated bond of the packed wall to an average depth of 0.75 centimeters. Approximately 0.25 centimeters wall thickness was substantially unhydrated.

EXAMPLE 8

In this example, an engineered waste container having a contaminant barrier is prepared. A waste material is identified and characterized having 0.2 moles of cesium and 0.05 moles of nickel per kilogram of waste. The cesium and nickel contaminants are identified as being particularly hazardous to the environment in which they were going to be placed. Because the waste has a moisture content of approximately 2%, there is also the possibility that the contaminants could leach out of the waste material. Twenty kilograms of waste are selected for containment having a unit density of 1.6 grams/cm$^3$.

A cementitious cylindrical container is designed having an approximate interior diameter of 20 centimeters and an interior height of approximately 10 centimeters such that the cylinder is capable of containing 12,500 cubic centimeters of hazardous waste material when sealed. The container is manufactured as follows: 1100 grams of Kaolinite and 730 grams of Zeolite Y are mixed together as dry powders, both having an average particle size less than 10 microns. A matrix mold is selected having a diameter of approximately 25 centimeters and a height of 15 centimeters. A cylindrical mandrel is placed inside the mold having a cross-sectional diameter of 20 centimeters. Approximately 2500 grams of ordinary Portland cement are placed in the mold. The mold is then sealed and pressurized in an isostatic press to 10,000 psi. The mold is released and the 1830 gram getter mixture is evenly placed in the cavity around the packed cement layer and the mold. The mold is sealed again and pressurized to 15,000 psi and released. Finally, an additional 2500 grams of cement are placed in the cavity between the getter layer and the exterior mold wall. The mold is sealed and pressurized to 30,000 psi and released.

The mandrel is removed and the "green" container has an interior diameter of 20 centimeters and the wall has a cross section of approximately 0.4 centimeters of cement on the outside of the container, a sandwiched getter layer of approximately 0.5 centimeters, and a final layer of 0.4 centimeters of cement as the interior wall of the container. A lid is made using a similar process. The 20 kilograms of waste are placed inside the container. The lid is screwed into place and sealed with a cement paste containing kaolinite and zeolite Y. The entire container with waste is then immersed in water for 15 minutes. The container is removed and allowed to hydrate and form an integral barrier to the hazardous waste and particularly to the cesium and nickel contaminants.

EXAMPLE 9

In this example, an engineered waste container having a contaminant barrier is prepared. 150 kilograms of hazardous waste having a moisture content of less than 5% and an iodide content of 0.1 moles per kilogram of waste are selected for containment. The waste has a density of 1.6 grams/cm$^3$ when compacted at 25,000 psi. The waste occupies a volume of 94 liters in a pressed cylindrical shape having a diameter of 20 centimeters and a height of 75 centimeters.

The waste is placed in an appropriately selected latex mold, and a dry powder mixture of 10 kilograms of cement and 9 kilograms of zeolite PbX is placed uniformly around the waste. The mold is sealed and pressurized to 20,000 psi. The mold is then released and opened. 20 kilograms of dry powdered cement is placed around the consolidated mass. The mold is then sealed and pressurized again to 25,000 psi and released. The final wall has a "green" density, as determined by ultrasound, of approximately 2.4 grams/cm$^3$.

Approximately 1.5 liters of water are then uniformly sprayed on the surface of the cylindrical mass. This amount of water is calculated to hydrate approximately $\frac{1}{8}$ of a centimeter of the wall leaving approximately $\frac{3}{4}$ of a centimeter of unhydrated cement and zeolite to capture any moisture or iodide that would potentially penetrate the container wall.

EXAMPLE 10

In this example, an engineered waste container having a contaminant barrier is prepared. A waste material is identified and characterized having 0.1 moles of cesium, 0.1 moles of iron and 0.05 moles of cobalt per kilogram of waste. The waste has a unit density of approximately 2 grams/cm$^3$. A preformed container having multiple layers of getter and cement is formed using a latex mold and an isostatic press. The inner layer is compressed around a cylindrical mandrel having a diameter of 20 centimeters and a height of 24 centimeters. The inner layer includes approximately 7200 grams of dry white Portland cement (free of gypsum) and is consolidated at 25,000 psi to an approximately thickness of 0.5 centimeters.

A getter layer is then pressed onto the inner layer at a pressure of about 25,000 psi. The getter layer includes a pre-blended dry powder mixture of 6000 grams of clinoptilolite, 900 grams of LaNi$_{4.7}$Al$_{0.3}$, and 3000 grams of dry gypsum-free cement. An exterior layer is made by uniformly distributing 7200 grams of gypsum-free, white Portland cement between the getter layer and the container mold. The mold is sealed and pressurized to a final pressure of 30,000 psi. The container is then immersed in aqueous solution saturated with lime for ten minutes, removed, and allowed to cure for six hours. The container has a final outside diameter of 23 centimeters and an interior diameter of 20 centimeters. A lid is prepared using a similar process.

Approximately 60 kilograms of the waste are placed in the container. A 0.3 water to cement ratio paste is used as a bonding agent to chemically bond the lid to the container and seal the waste in the containment system.

EXAMPLE 11

In this example, an engineered waste container having a contaminant barrier is prepared. A pre-processed, mixed hazardous waste form is identified and characterized as having 0.2 moles of radioactive cesium, 0.1 moles of benzene, and 0.5 moles of mixed alcohol per kilogram of waste. The pre-processed waste is placed in a spherical latex mold approximately 42 centimeters in diameter and isostatically compressed to 30,000 psi. Subsequently, a dry mixture of 15 kilograms of montmorillonite, 4.2 kilograms of phlogopite (mica), and 5 kilograms of ordinary Portland cement is uniformly placed around the compacted waste inside the spherical mold. The mold is sealed and pressed to 20,000 psi and released An additional 7 kilograms of bi-modal, gap-graded ordinary Portland cement without gypsum is uniformly placed around the previously compacted spherical mass inside the mold. The mold is sealed and pressed to 25,000 psi and released. The sphere is placed in sea water and allowed to cure underwater.

EXAMPLE 12

In this example, a waste container having a contaminant barrier is prepared by encasing hazardous waste with powdered hydraulic cement containing a liquid, ion, or gas getter. Ordinary Portland cement and about 200 grams of zeolite A are mixed. The hazardous waste material is known to include approximately 50 grams of Hg$^{2+}$. The hazardous waste and the cement/zeolite mixture are positioned within a pliable polymeric cylindrical mold such that from 1 to 2 inches of the cement/zeolite mixture surrounds the waste material. The cement/zeolite mixture also fills irregularities around the exterior surface of the hazardous waste materials. The waste container is then compressed at a pressure of 30,000 psi.

The hazardous waste container is then hydrated by immersing the container in saturated lime water, maintained at a temperature between 22° C. and 25° C. at atmospheric pressure during hydration. Testing to determine leach rates of the cured hazardous waste container show that no measurable amounts of mercury escape the waste container.

EXAMPLE 13

In this example, a waste container is prepared by encasing hazardous waste with a getter layer and a cement layer. The hazardous waste material is known to include approximately 50 grams of $Hg^{2+}$. Ordinary Portland cement and about 200 grams of powdered zeolite A are used in this example. The hazardous waste and the zeolite are positioned within a pliable polymeric cylindrical mold such that a zeolite layer surrounds the waste material. If necessary, a binder may be used to hold the powdered zeolite together. Binders known to those skilled in the art, including hydraulic cement, may be used. The zeolite layer fills irregularities around the exterior surface of the hazardous waste materials. A layer of the ordinary Portland cement is then positioned around the zeolite layer in the mold. The cement and zeolite layers are isostatically compressed at a pressure of 35,000 psi.

The outer surface of the Portland cement layer is then hydrated in immersion saturated lime water, maintained at a temperature between 22° C. and 25° C. at atmospheric pressure during hydration. Testing to determine leach rates of the cured hazardous waste container show that no measurable amounts of mercury escape the waste container.

EXAMPLE 14

A waste container is prepared according to the procedure of Example 13, except that the hazardous waste is encased with a layer containing multiple liquid, ion, or gas getters rather than a single getter. The hazardous waste material is known to include a variety of radioactive and nonradioactive hazardous constituents. Mordenite, Chabazite, Faujasite, and Linde 5A are selected as suitable liquid, ion, or gas getters. The amount of each respective getter is calculated according to the general procedure outlined in Examples 1-4 above.

EXAMPLE 15

A hazardous waste container is prepared according to the procedure of Example 14, except that the various getters are graded by size to improve packing efficiency.

EXAMPLE 16

A hazardous waste container is prepared according to the procedure of Example 14, except that the hazardous waste is encased with multiple layers of liquid, ion, or gas getters rather than a single layer. The hazardous waste material is known to include a variety of radioactive and nonradioactive hazardous constituents including organic residues. Zeolite X, NaZSM5, Clinoptilolite, and Linde 5A are selected as suitable liquid, ion, or gas getters. The amount of each respective getter is calculated according to the general procedure outlined in Examples 1-4 above.

The hazardous waste and getters are positioned within a pliable polymeric cylindrical mold such that layer containing zeolite X surrounds the waste material. If necessary, a binder may be used to hold the zeolite X together. Binders known to those skilled in the art, including hydraulic cement, may be used. A second layer containing NaZSM5 is positioned around the zeolite X layer, followed by a third layer containing Clinoptilolite and a fourth layer containing Linde 5A. Finally, a layer of the ordinary Portland cement is then positioned around the getter layers in the mold. The cement and getter layers are isostatically compressed, and the outer cement layer is hydrated.

EXAMPLE 17

A waste container is prepared according to the procedure of Example 13, except that the hazardous waste is encased with multiple getter layers having mixtures of different getters. The waste material includes a variety of radioactive and nonradioactive hazardous constituents. Zeolon, zeolite X, chabazite, and Linde 5A are selected as suitable liquid, ion, or gas getters. The amount of each respective getter is calculated according to the general procedure outlined in Examples 1-4 above.

The waste material and a first getter layer are positioned within a pliable polymeric cylindrical mold such that the first getter layer, containing a mixture of zeolon and zeolite X surrounds the waste material. If necessary, a binder may be used to hold the getter layer together. A second getter layer containing a mixture of chabazite and Linde 5A is positioned around the first getter layer. Finally, a layer of the ordinary Portland cement is then positioned around the getter layers in the mold. The cement and getter layers are isostatically compressed, and the outer cement layer is hydrated.

EXAMPLE 18

In this example, a waste container is prepared by compressing a getter and a powdered hydraulic cement composition into a mold. The mold is capable of defining an internal cavity within the waste container. The container wall includes a layer containing the getter and a layer containing the cement composition. The hazardous waste container is designed to hold hazardous waste material which includes approximately 50 grams of $Hg^{2+}$. Ordinary Portland cement and about 200 grams of powdered zeolite A are used in this example. The zeolite A is positioned within a pliable polymeric mold and compressed to form a zeolite layer.

A layer of the ordinary Portland cement is then positioned around the exterior surface of the zeolite layer. The cement is isostatically compressed. A removable lid for the waste container is prepared by compressing separate zeolite and hydraulic cement layers as described above. The Portland cement layers of the container and lid are then hydrated by immersion in saturated lime water.

EXAMPLE 19

A waste container is prepared according to the procedure of Example 18, except that a mixture of various liquid, ion, or gas getters is used rather than a single getter. The container wall includes a layer containing a mixture of various getters and a layer containing the cement composition. The waste container is designed to hold waste material having a variety of radioactive and nonradioactive hazardous constituents. Mordenite, Chabazite, Faujasite, and Linde 5A are selected as suitable liquid, ion, or gas getters. The amount of each respective getter is calculated according to the general procedure outlined in Examples 1-4 above.

EXAMPLE 20

A waste container is prepared according to the procedure of Example 19, except that the various getters are graded by size to improve packing efficiency.

EXAMPLE 21

A waste container is prepared according to the procedure of Example 18, except that the container wall includes multiple layers containing various getters and a layer containing the cement composition. The hazardous waste container is designed to hold waste material having a variety of radioactive and nonradioactive hazardous constituents. Mordenite, Chabazite, Faujasite, and Linde 5A are selected as suitable liquid, ion, or gas getters. The amount of each respective getter is calculated according to the general procedure outlined in Examples 1-4 above.

EXAMPLE 22

In this example, a multi-layered waste container is prepared according to the procedure of Example 21, except that the outer layer of Portland Cement also contains a plurality of fibers wrapped around the compressed high alumina cement to improve the mechanical properties of the final hazardous waste container.

EXAMPLE 23

In this example, a multi-layered waste container is prepared according to the procedure of Example 21, except that the outer layer of Portland Cement also contains electrical and thermal conducting aggregates dispersed therein to improve the mechanical properties of the final hazardous waste container.

EXAMPLE 24

In this example, a cementitious contaminant barrier capable of preventing passage of radon gas is prepared in situ. The cementitious contaminant barrier is prepared at a site for a proposed building known to release unacceptably high levels of radon gas. Rather than pouring a concrete floor directly on compacted excavated ground, a 50:50 dry mixture by weight of mordenite and Portland cement is placed on the ground to a depth of about 1.5 inches. The mixture is compacted by vibration compaction to a finished depth of less than 1 inch. The Portland cement is partially hydrated by spraying the surface with water. Conventional concrete is thereafter poured over the mordenite/cement mixture to provide additional mechanical and structural strength.

It will be appreciated by those skilled in the art that there are many different possible combinations of liquid, ion, or gas getters that were not specifically mentioned in the foregoing examples. A few possible combinations are listed in the above section entitled "Liquid, Gas, and Ion Getters."

The use of multiple layers of liquid, ion, or gas getters may be advantageously used in the design of contaminant barriers as molecular sieves to prevent specific waste constituents from passing through one layer into another. For instance, knowing the relative selectivities of various liquid, ion, and gas getters, one layer of the barrier may be selected to trap a specific ion or class of ions with additional layers selected to trap other ions.

8. Summary

From the foregoing, it will be appreciated that the present invention provides novel cementitious contaminant barriers which are constructed of strong materials that do not intrinsically corrode to produce gases. The present invention also provides novel contaminant barriers which include liquid, ion, and gas getters. In addition, the present invention provides contaminant barriers constructed of materials which are self-healing upon contact with aqueous solution. The present invention further provides contaminant barriers which do not require high temperature vitrification processes. Finally, it will be further appreciated that the present invention provides novel contaminant barriers which are inexpensive.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preparing a contaminant barrier from a hydraulically bonded cement composition, the method comprising the steps of:
   (a) deliberately positioning a powdered hydraulic cement composition and at least one getter into a near net final position substantially corresponding to a desired contaminant barrier shape, said getter being capable of preventing passage of a contaminant through the barrier; and
   (b) hydrating the powdered hydraulic cement composition without substantial mechanical mixing of the cement and water.

2. A method for preparing a contaminant barrier as defined in claim 1, wherein the at least one getter includes an ion getter.

3. A method for preparing a contaminant barrier as defined in claim 1, wherein the at least one getter includes a liquid getter.

4. A method for preparing a contaminant barrier as defined in claim 1 wherein the at least one getter includes a gas getter.

5. A method for preparing a contaminant barrier as defined in claim 1, wherein the powdered hydraulic cement composition is hydrated by contacting the powdered hydraulic cement composition with gaseous water.

6. A method for preparing a contaminant barrier as defined in claim 1, wherein the powdered hydraulic cement composition is hydrated in a controlled gaseous environment including carbon dioxide.

7. A method for preparing a contaminant barrier as defined in claim 1, wherein the powdered hydraulic cement composition is hydrated by contacting the powdered hydraulic cement composition with an aqueous solution.

8. A method for preparing a contaminant barrier as defined in claim 1, wherein the powdered hydraulic cement composition has a predetermined polymodal size distribution.

9. A method for preparing a contaminant barrier as defined in claim 1, further comprising the step of deliberately positioning an aggregate within the powdered hydraulic cement composition prior to hydrating the cement.

10. A method for preparing a contaminant barrier as defined in claim 9, wherein the aggregate comprises a plurality of aggregate particles having a predetermined polymodal size distribution.

11. A method for preparing a contaminant barrier as defined in claim 9, wherein the aggregate includes a plurality of fibers.

12. A method for preparing a contaminant barrier as defined in claim 1, wherein the powdered hydraulic cement composition and the at least one getter are compressed into the near net final position by isostatic compression in a mold.

13. A method for preparing a contaminant barrier as defined in claim 1, wherein the powdered hydraulic cement includes a mixture of chemically different hydraulic cements.

14. A method for preparing a contaminant barrier as defined in claim 1, wherein the powdered hydraulic cement includes a Portland cement.

15. A method for preparing a contaminant barrier as defined in claim 1, wherein the contaminant includes a radioactive waste.

16. A method for preparing a contaminant barrier as defined in claim 1, wherein the contaminant includes a heavy metal ion.

17. A method for preparing a contaminant barrier as defined in claim 1, wherein the contaminant includes a gas generator.

18. A method for preparing a contaminant barrier as defined in claim 1, wherein the contaminant includes both radioactive and hazardous waste.

19. A method for preparing a contaminant barrier as defined in claim 1, wherein the at least one getter includes a zeolite.

20. A method for preparing a contaminant barrier as defined in claim 1, wherein the at least one getter includes a mixture of different zeolites.

21. A method for preparing a contaminant barrier as defined in claim 1, wherein the at least one getter includes a layered clay.

22. A method for preparing a contaminant barrier as defined in claim 1, wherein the at least one getter includes a mixture of layered clays.

23. A method for preparing a contaminant barrier as defined in claim 1, wherein the at least one getter includes a mixture of at least one zeolite and at least one layered clay.

24. A method for preparing a contaminant barrier as defined in claim 1, wherein the at least one getter includes a mixture of different getters.

25. A method for preparing a contaminant barrier as defined in claim 1, wherein the powdered hydraulic cement composition includes a water-containing compound, such that at least a portion of the water necessary for hydrating the powdered hydraulic cement is capable of being provided by the water-containing compound.

26. A method for preparing a contaminant barrier as defined in claim 1, wherein a portion of the powdered hydraulic cement composition remains substantially unhydrated.

27. A method for preparing a contaminant barrier as defined in claim 1, wherein the powdered hydraulic cement composition and the at least one getter are deliberately positioned in substantially separate layers.

28. A method for preparing a contaminant barrier as defined in claim wherein the powdered hydraulic cement composition and the at least one getter are deliberately positioned as a mixture.

29. A method for preparing a contaminant barrier as defined in claim 1, wherein the desired contaminant barrier shape is in the form of a waste container.

* * * * *

UNITED STATES PATENT AND TRADEMARK OFFICE
CERTIFICATE OF CORRECTION

PATENT NO. : 5,169,566
DATED : December 8, 1992
INVENTOR(S) : GALEN STUCKY et al.

It is certified that error appears in the above-indentified patent and that said Letters Patent is hereby corrected as shown below:

Column 1, line 45, "effects" should be --affects--
Column 1, line 46, after "life" insert --.--
Column 2, line 6, "As a results" should be --As a result,--
Column 2, line 9, after "sealed" insert --.--
Column 2, line 14, "be cause" should be --because--
Column 2, line 22, "transuranicradioactive" should be --transuranic radioactive--
Column 6, line 2, after "solution" insert --.--
Column 8, line 23, "whole" should be --hole--
Column 9, line 52, "gasses" should be --gases--
Column 10, line 22, "Tl30" should be --Tl$^+$--
Column 10, line 22, "LI30" should be --LI$^+$--
Column 11, line 4, after "radioactive" insert --and--
Column 12, line 16, "gasses" should be --gases--
Column 12, line 68, "based" should be --base--
Column 13, line 6, after "material" insert --.--
Column 24, line 43, after "released" insert --.--
Column 30, lines 32-33, "as defined in claim" should be --as defined in claim 1--

Signed and Sealed this

Fourth Day of January, 1994

*Attest:*

BRUCE LEHMAN

*Attesting Officer*  Commissioner of Patents and Trademarks